(12) United States Patent
Knauer et al.

(10) Patent No.: US 6,962,481 B2
(45) Date of Patent: Nov. 8, 2005

(54) TURBOCHARGER FOR VEHICLE WITH IMPROVED SUSPENSION OF THE ACTUATING MECHANISM FOR VARIABLE NOZZLES

(75) Inventors: Uwe Knauer, Ladenburg (DE); Siegfried Ritter, Frankenthal (DE); Robert Lingenauber, Frankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 140 days.

(21) Appl. No.: 10/382,144

(22) Filed: Mar. 5, 2003

(65) Prior Publication Data

US 2003/0170116 A1 Sep. 11, 2003

(30) Foreign Application Priority Data

Mar. 5, 2002 (DE) .......................................... 102 09 444

(51) Int. Cl.$^7$ ................................................ F01D 17/16
(52) U.S. Cl. ........................................ 415/160; 415/164
(58) Field of Search ................................ 415/160, 163, 415/164, 165; 417/405, 406, 407; 60/602

(56) References Cited

U.S. PATENT DOCUMENTS 2,860,827 A    11/1958   Egli
4,179,247 A    12/1979   Osborn
4,490,622 A    12/1984   Osborn
4,679,984 A  *  7/1987   Swihart et al. ............. 415/163
4,804,316 A     2/1989   Fleury
6,145,313 A  * 11/2000   Arnold ....................... 60/605.2

FOREIGN PATENT DOCUMENTS

| EP | 0 160 460    | 11/1985 |
| EP | 0 226 444 B1 | 6/1987  |
| JP | 50-131004    | 10/1975 |
| JP | 58-93902     | 6/1983  |
| JP | 59-70036     | 5/1984  |

* cited by examiner

*Primary Examiner*—Ninh H. Nguyen
(74) *Attorney, Agent, or Firm*—Pendorf & Cutliff; Greg Dziegielewski

(57) ABSTRACT

A turbocharger with an improved suspension mechanism for the actuation ring of a variable nozzle mechanism, for improved maintenance of the geometry of the suspension mechanism in the case of extreme temperature oscillations. The suspension mechanism includes a number of guide rollers (149) provided between housing part (126) and nozzle ring (138) with circumferential grooves (159) in which the inner circumference of the actuating ring rides. The rollers are formed as one piece together with axial extensions (149', 149", 149a, 149b), which extensions are rotatably seated in appropriate bores in the nozzle ring (138) and/or in the housing part (126). The axial extensions can have diameters which are smaller than or the same as the diameter of the actual roller part.

9 Claims, 7 Drawing Sheets

TURBOCHARGER FOR VEHICLE WITH IMPROVED SUSPENSION OF THE ACTUATING MECHANISM FOR VARIABLE NOZZLES

BACKGROUND OF THE INVENTION

1. Field of the Invention

The present invention concerns a turbocharger of the type set forth in the precharacterizing portion of claim 1.

2. Description of the Related Art

In turbomachinery in which the turbine is intended to drive a compressor or the like, it is often desirable to control the flow of motive gas to the turbine to improve its efficiency or operational range. In order to accomplish this, the nozzle passages leading to the turbine wheel may be of variable geometry. These variable geometry nozzle passages can be provided by means of a plurality of blades which are pivotable so as to alter the configuration of the passages therebetween. The design of the suspension system used in association with the pivoting blade design is critical to prevent binding of either the suspension system or the blades.

U.S. Pat. Nos. 2,860,827 and 4,179,247 disclose designs to prevent binding of the pivoting blade actuation mechanism. However, none of the above-mentioned designs are suspension systems for an actuation system which accommodates the thermal cycling experienced by the turbine housing as well as the components of the actuation system.

U.S. Pat. No. 2,860,827, the content of which is to be considered as incorporated by reference herein, describes a turbocharger with variable turbine geometry. Exhaust gasses flow radially past nozzles in a ring-shaped passage situated between the housing part of the turbine housing and the nozzle ring, which nozzles are defined by the intermediate space between nozzle blades which are arranged in a ring and mounted pivotably along the nozzle ring, and operate in such a manner that the nozzles are maximally opened when the nozzle blades are radial, and maximally closed when the nozzle blades are essentially oriented tangential.

The nozzle blades are mounted to the nozzle ring by means of pins, which extend through the nozzle ring, and which carry actuating arms on their opposite ends.

Provided on the same plane as the circularly arranged actuating arms there is a second ring, the so-called actuating ring, for simultaneous actuation of all actuating arms, for which the actuating ring on its inner edge includes engagement means which cooperate with corresponding engagement means on each of the actuating arms, so that with limited coaxial pivoting of the actuating ring with respect to the nozzle ring all actuating arms, and the therewith associated nozzle blades, can be pivoted.

Associated with the actuating ring is an actuating means which extends through the turbine housing in order to control the actuating ring from outside the housing.

The actuating ring is carried by a certain number of rollers each of which is provided with a groove, and guided for limited rotation, which rollers can be arranged in a circular pattern corresponding to the inner edge of the actuating ring.

These rollers can rotate freely about pins, which pins can be provided in the same part of the turbine housing as the above described actuating means.

The pins extend through the wall of the turbine housing and are axially fixed directly outside and inside this wall freely rotatably by means of spring rings.

This arrangement functions in satisfactory manner as long as no great temperature oscillations occur.

Turbochargers are however subjected to very strong temperature oscillations as a result of the flowing through of hot exhaust gasses through the turbine part, so that the turbine part and adjacent parts are heated up to 900° C.

These frequently extereme temperature oscillations, together with the extremely high rotation speed of the turbine wheel and the compressor wheel, produce extreme stresses for all components, which results in an early expenditure and loss of function of the turbocharger.

It is particularly important that the geometric configuration of all cooperating parts, such as nozzle ring, actuating ring, rollers and pins, etc. remain intact, without thermal misalignment and hysteresis.

The turbocharger according to U.S. Pat. No. 2,860,827 is not optimally designed in order to maintain the geometry of the described parts in the case of large thermal oscillations.

U.S. Pat. No. 4,179,247 describes a turbocharger and in particular a suspension mechanism for the actuating ring, which is in the form of a double ball bearing.

This type of ball bearing is particularly critical in the above-mentioned conditions and is beyond this very complicated in its construction.

Many attempts have been made in order to solve the above described problem, and in part these problems were solved by the turbocharger according to European Patent 0 226 444 (U.S. Pat. No. 4,804,316).

This patent describes a suspension mechanism for the actuating ring with pins and rollers, the rollers having circumferential grooves, which can carry and guide the actuating ring in a manner similar to that of U.S. Pat. No. 2,860,827.

In EP-0226444 the roller pins are however not fixed axially in the housing, but rather they extend freely between bores in the housing on one side to bores in the nozzle ring on the other side, wherein a certain separation is maintained between the inner side of the housing and the opposing side of the nozzle ring in order to produce a second ring gap, and wherein the grooved rollers are provided for free rotation on the pins within this second ring gap.

Since the ends of the pins engage in the nozzle ring, the effect is to provide an exact co-axiality of nozzle ring and actuating ring.

In practice however two problems are associated therewith.

On the one hand the construction of the actuating mechanism according to U.S. Pat. No. 2,860,827 is complicated, and the introduction of the roller pins in the bores first in the nozzle ring or the housing, thereafter the seating of the rollers upon the pins and the actuating ring upon the rollers and then the introduction of the free ends of the pins into the bores in the respective other element (housing or nozzle ring) element is very difficult to accomplish without an exact, axially parallel arrangement of these free ends of the pins.

This is a true test of finesse, since the orientation of the bores between the two elements is never perfect, and besides this, because of the necessary tolerance between pin and bore, the pins tend to be tilted or askew prior to introduction into the second element.

On the other hand the bores in the housing and those in the nozzle ring are subjected to different thermal dilations, so that in operation the pins are directed away from their exact axially parallel orientation, which detracts from the friction free operation of the parts.

SUMMARY OF THE INVENTION

The present invention solves the described problems and disadvantages of the state of the art and provides a turbocharger which exhibits the characteristics according to the characterizing portion of claim 1.

Further tasks and advantages of the invention are seen from the dependent claims.

It is thus for example one of the tasks of the invention to provide an improved actuating system for a turbine with variable nozzle geometry. It is a further task of the invention to construct an actuating system, in which the actuating ring and the nozzle ring remain precisely coaxial in operation.

It is further a task to provide a reliable actuating system.

Finally it is task to provide a nozzle ring, which remains continuously oriented relative to the turbine side wall, in order to produce a ring shaped gap with constant spacing.

BRIEF DESCRIPTION OF THE DRAWINGS

In the following the invention will be described in greater detail on the basis of the figures. There is shown in.

DETAILED DESCRIPTION OF THE INVENTION

Figures 1, 2:
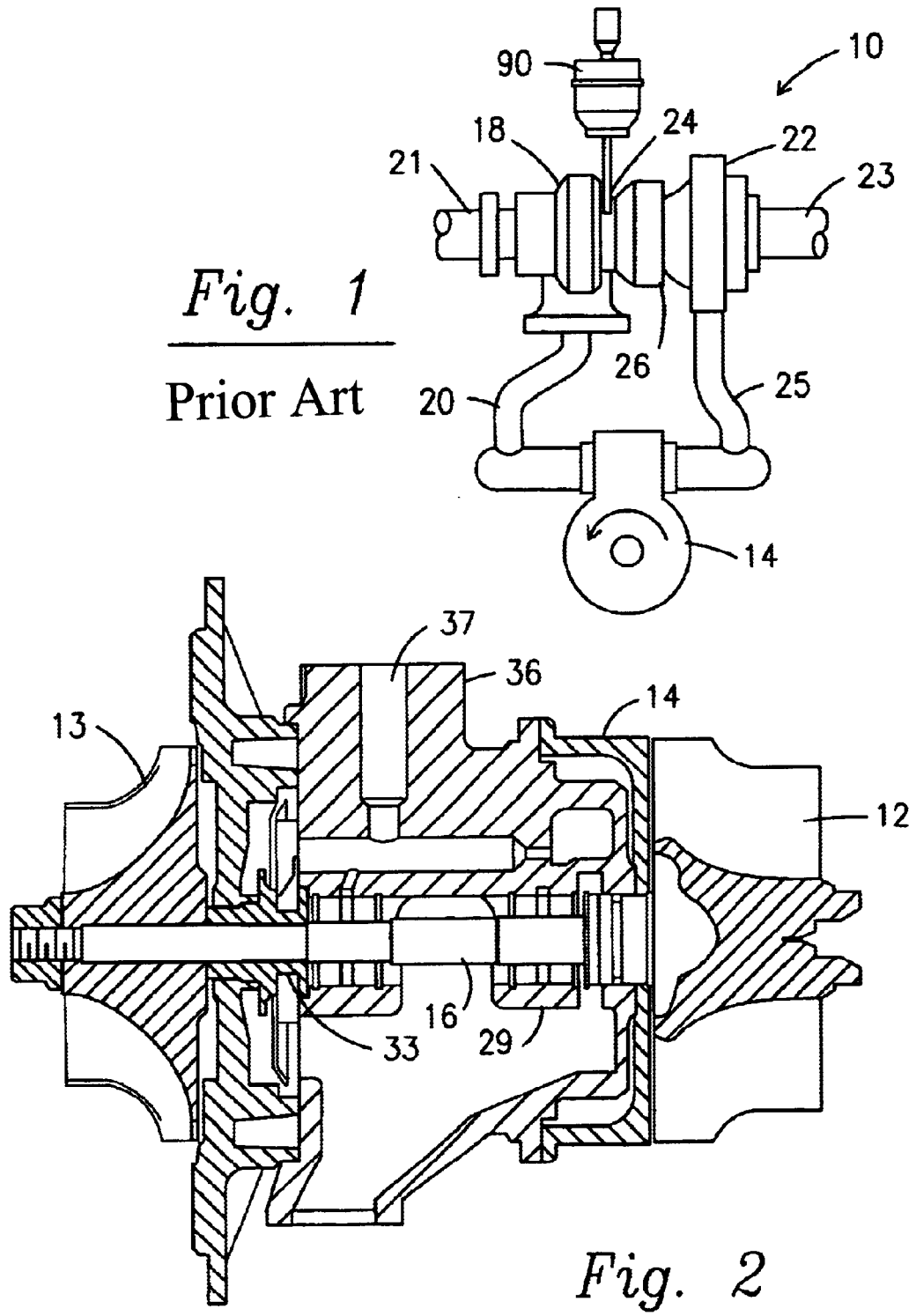
FIGS. 1–6 different views of a turbocharger according to the state of the art.
Figure 3:
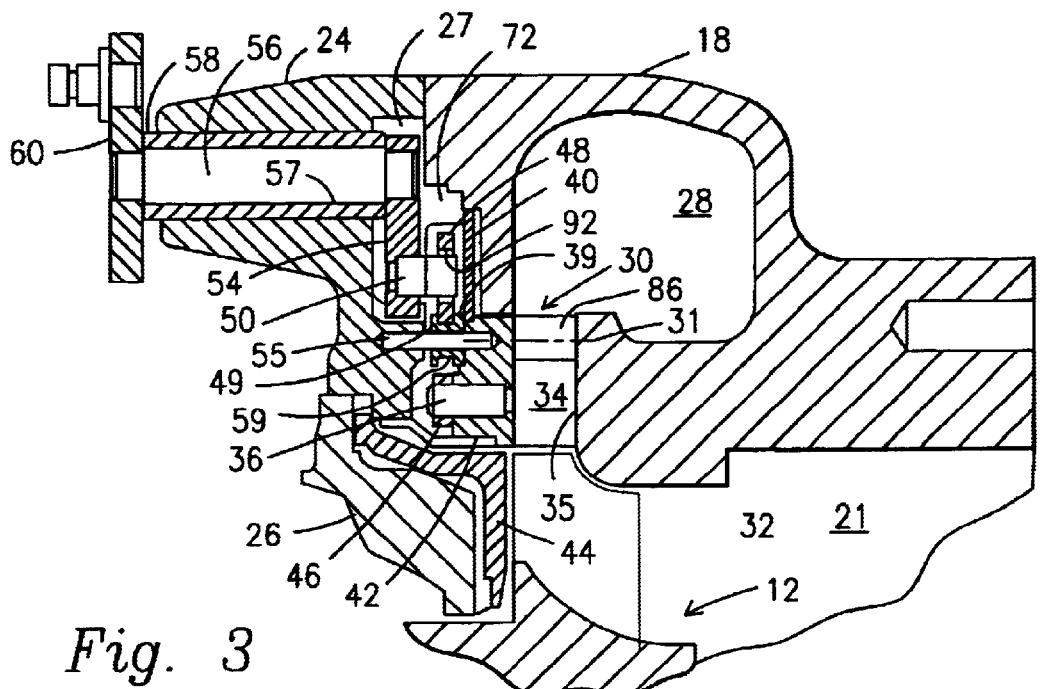

An engine system as shown in FIGS. 1 to 3 includes turbomachinery in the form of a turbocharger 10 generally comprising a turbine wheel 12 and a compressor impeller 13 mounted on opposite ends of a common shaft 16. The turbine wheel 12 is disposed within a turbine housing 18 which includes an inlet 20 for receiving exhaust gas from an engine 14 and an outlet 21 for discharging the exhaust gas. The turbine housing 18 guides the engine exhaust gas into communication with and expansion through the turbine wheel 12 for rotatably driving the turbine wheel. Such driving of the turbine wheel simultaneously and rotatably drives the compressor impeller 13 which is carried within a compressor housing 22. The compressor housing 22, including an inlet 23 and outlet 25 and the compressor impeller 13 cooperate to draw in and compress ambient air for supply to the intake of the engine 14.

The turbine housing 18 is mounted to a flange member 24 which, in turn, is mounted to center housing 26 and could be a part of it. The compressor housing 22 is mounted on the other side of the center housing 26. The center housing 26 includes a bearing means 29 for rotatably receiving and supporting the shaft 16. A thrust bearing assembly 33 is carried about the shaft adjacent the compressor housing for preventing axial excursions of the shaft 16. A heat shield 44 is positioned about the shaft 16 at the turbine end in order to insulate the center housing 26 from the harmful effects of the exhaust gas.

Lubricant such as engine oil or the like is supplied via the center housing 26 to the journal bearing means 29 and to the thrust bearing assembly 33. A lubricant inlet port 37 is formed in the center housing 26 and is adapted for connection to a suitable source of lubricant such as filtered engine oil. The port communicates with a network of internal supply passages which are formed in the center housing 26 to direct the lubricant to the appropriate bearings. The lubricant circulated to the bearings is collected in a suitable sump or drain for passage to appropriate filtering, cooling, and recirculation equipment, all in a well-known manner.

FIG. 3 shows the turbine housing 18 forms a generally scroll-shaped volute 28 which accepts the exhaust gas from the engine 14 and directs it onto the blades of the turbine wheel 12 through an annular passage 30. Thereafter, the exhaust gas flows axially through the turbine shroud 32 and exits the turbocharger through outlet 21 either into a suitable pollution-control device or the atmosphere. Placed within the annular passage way 30 are a plurality of pivotable blades 34 which operate to vary the geometry of the annular passage 30 to control the angle at which the exhaust gas impacts the blades of the turbine wheel 12. This in turn controls the amount of energy imparted to the compressor wheel and ultimately the amount of air supplied to the engine.

The flange member 24 and the turbine housing 18 form between them a cavity 27 which houses the hardware used in conjunction with the variable geometry turbine to be described below. The annular passage 30 for the exhaust gas is defined between the inner side wall 31 of the turbine housing 18 and an annular nozzle ring 38. Located circumferentially around and within the annular passage 30 are a plurality of blades 34. Each blade 34 is mounted to be capable of pivoting on the nozzle ring 38 on a blade pin 36 which can turn in a bore in the nozzle ring. Attached by welding to the outer end of each blade pin is a blade arm 46, the shape of which can best be seen in FIG. 6. The nozzle ring is between the blades and the blade arms.

Figure 4:
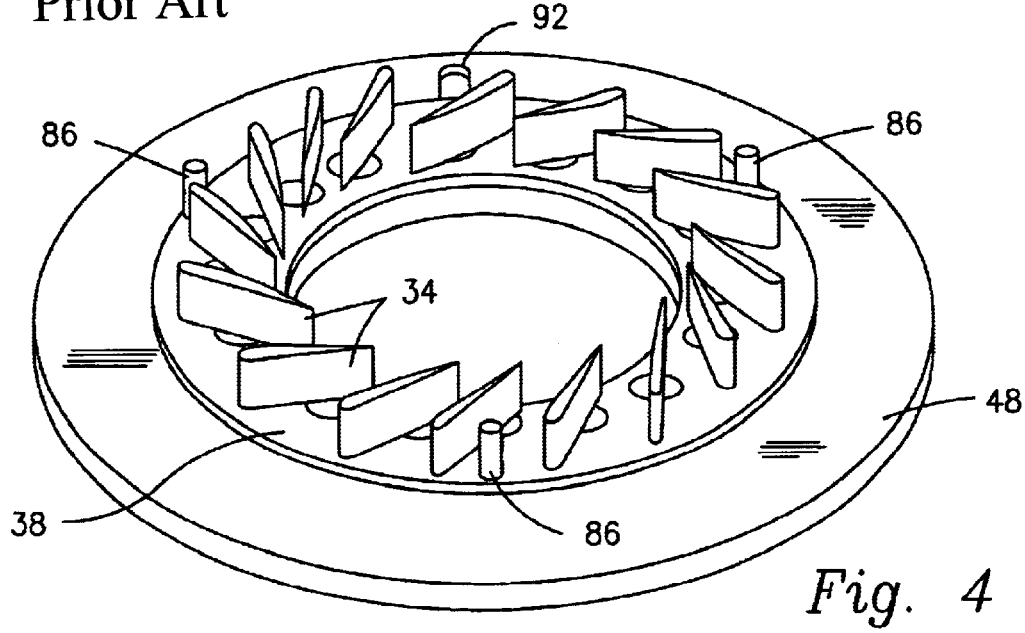
Figure 6:
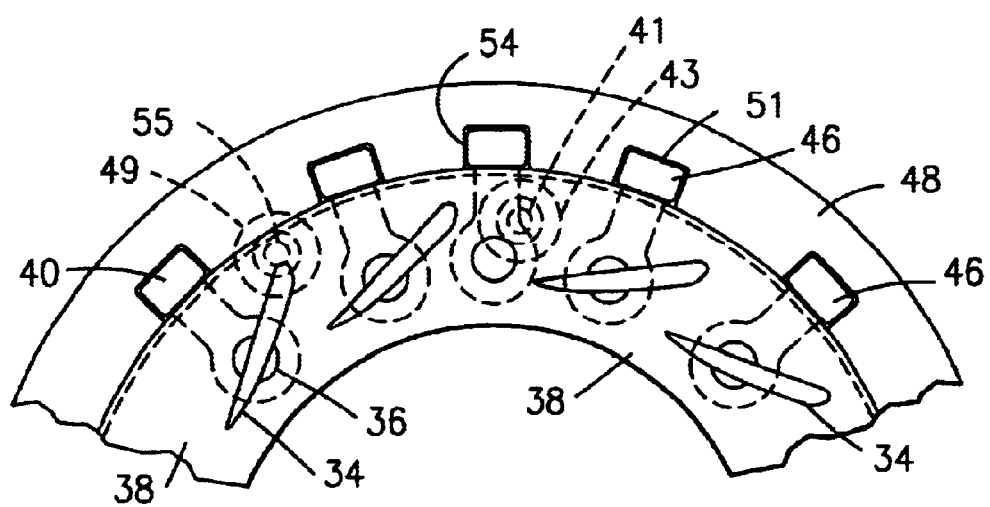

Located within passage 30 are a plurality of spacers 86. As shown in FIGS. 4 and 6, spacers 86 are located at the periphery of the plurality of blades. They have an axial length (within the range of 0.005 to 0.015 cm) longer than the blade length. The spacers are press fitted in bores formed in the nozzle ring 38, though other methods could be used.

An annular actuating ring 48 has a plurality of slots 51 on its inner radial surface, each of which receives a blade arm 46. At the inner periphery of the actuating ring 48 are located at least three circumferentially spaced rollers 49. Rollers 49 are rotatably mounted on pins 55 radially inwardly of the actuating ring and with respective ends inserted in bores in the flange member 24 and the nozzle ring 38. Pins 55 have some axial clearance within these bores in order to allow nozzle ring 38 slight axial movement. Rollers 49 include an annular groove 59 therearound for acceptance of the inner periphery of the actuating ring 48. Pins 55 and rollers 49 could be provided additionally at the periphery of the actuating ring 48 if so desired. The pins not only provide a mounting for the actuating ring; they also hold and concentrically locate the nozzle ring 38 and prevent it from rotating.

The rollers 49 provide for ease of rotation of the actuating ring 48 relative to the flange member 24 and together with pins 55 ensure the concentricity between actuating ring 48 and nozzle ring 38. The shape of the blade arms 46 as seen in FIG. 6 must be such as to maintain basically a rolling action within slots 51 to avoid binding within actuating ring 48 as it rotates to pivot blades 34.

The flange member 24 includes a recessed portion for acceptance of the actuation system as will be described below. Formed in flange member 24 is a shoulder 72 which acts in cooperation with belleville spring 40. The inboard side of the radially outer edge of spring 40 rests against the shoulder 72, and when assembled, the opposite side of the radially inner edge of the spring acts against the shoulder portion 39 of the nozzle ring 38 such that it loads the nozzle ring 38 and the spacers 86 against the turbine side wall 31.

Shoulder 72 is continuous about flange 24 with the exception of a break to make room for the bell crank system defined below.

A tube member 42 which is generally cylindrically shaped with an annular bend therein, is slidably engageable within the inner radial surface of the nozzle ring 38. The tube member 42 acts as a seal in the event that any exhaust gas leaks behind the nozzle ring 38 and into the cavity 27 formed between the flange 24 and the turbine housing 18, thereby sealing the turbine housing 18 from the center housing 26.

In order to rotate the actuating ring 48 between its two extreme positions which correspond to the limits of the geometry of the annular passage 30, a bell crank system is used. A pin 50 is rigidly connected to a first linkage member 54 at one end thereof. The pin 50 fits within a corresponding slot 92 within the actuating ring 48 in order to transmit any movement in the bell crank to the actuating ring 48. The first linkage member 54 is rigidly connected at its other end to a rod member 56. The rod 56 projects through a bore 57 in the flange member 24 to a point outside the turbocharger assembly. Bushing 58 is used in association with rod 56. The rod 56 is rigidly connected at its other end to a second linkage member 60 which in turn is connected to an actuator 90, shown in FIG. 1. The actuator shown is a vacuum boost type which is well known in the art. Furthermore, it is envisioned that other actuator means can be used to control the movement of the blades.

During operation, movement of the second linkage member 60 is translated into movement of the first linkage member 54 via rod 56. The existence of pin 50 will translate any movement of the linkage member 54 into rotational movement of actuating ring 48. In turn, blade arms 46 roll against the side wall of slots 51 to pivot blades 34 while nozzle ring 38 remains stationary. Thus, there is a change in the geometry of the plurality of passageways formed between adjacent blades.

Figure 5:
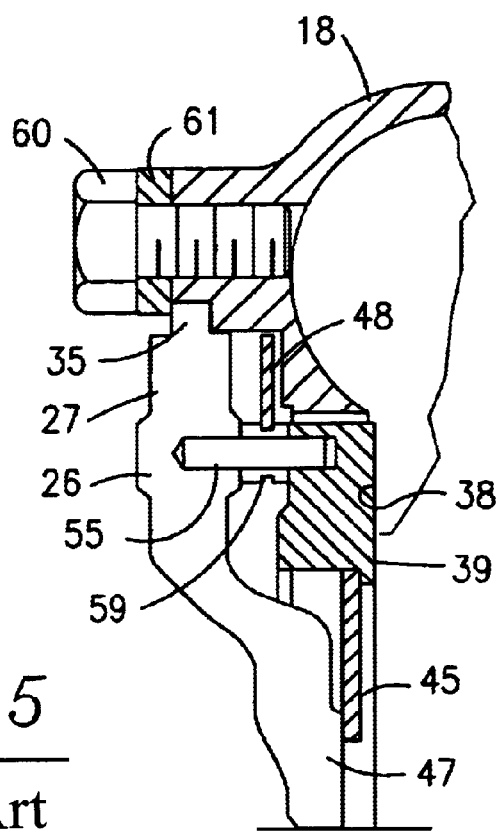

An alternative embodiment of the invention is shown in FIGS. 5 and 6. FIG. 5 is a partial sectional view of the nozzle and actuating rings, 38 and 48, respectively.

In the alternative embodiment the nozzle ring 38 is attached to the turbine housing 18 and defines with it the annular passageway 30. Specifically, the nozzle ring 38 is bolted directly to the turbine housing 18 by a ring of bolts 60.

The blades are mounted on the nozzle ring 38 by blade pins 36, which can turn in bores in the nozzle ring and are attached at one end to the blades and at the other end to a blade arm 46. Arm 46 is attached to blade pin 36 by any suitable method of attachment such that the nozzle ring 38 is located between the blade 34 and the blade arm 46.

FIG. 6 shows that actuating ring 48 is an annular ring with a plurality of slots 51 on its inner radial surface. Each slot receives the outer end of a blade arm 46. Located at the internal periphery of the actuating ring 48 are at least three spaced rollers 49. Rollers 49 are rotatably mounted on pins 55 spaced radially inwardly of the actuating ring and secured between the nozzle ring 38 and center housing 26, each of which has bores for acceptance and location of the pins. Rollers 49 include an annular groove 59 therearound for acceptance and guidance of the inner periphery of the actuating ring. Rollers 49 and pins 55 ensure the concentricity between the actuating ring 48 and nozzle ring 38.

The alternative embodiment has eliminated several elements of the preferred embodiment, i.e. the flange member 24 and tube member 42. Center housing 26 is different in that it includes a radially outwardly extending flange portion 27 having a bore 57 therethrough for acceptance of the actuation system. Furthermore, the flange portion 27 includes shoulder 35 shaped to mate with the turbine housing 18 and an annular land 47 above the central bore.

As shown in FIG. 5, an annular disc 45 is positioned about the turbocharger shaft such that its radially inner edge rests against the land 47 and its radially outer edge rests against a shoulder 39 formed on the inner periphery of nozzle ring 38. Disc 45 functions as a heat shield and seal to prevent heat and exhaust gas leakage around nozzle ring 38.

Figure 7A:
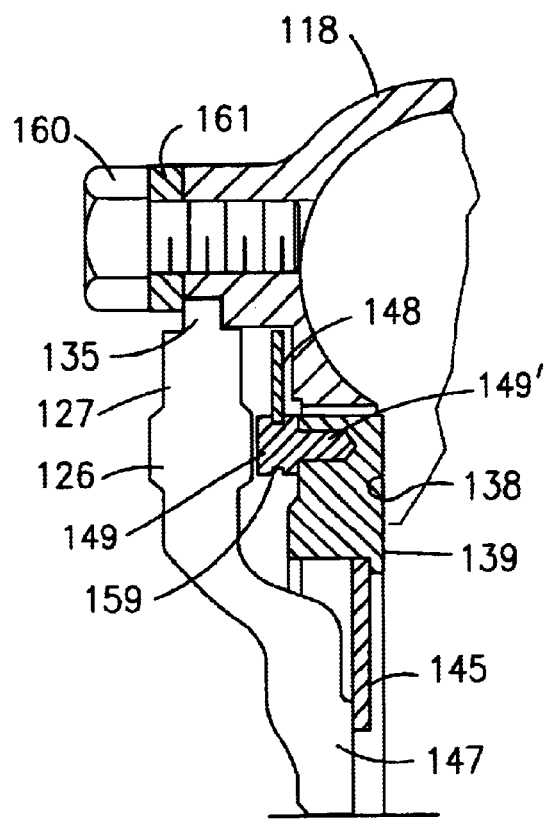
FIGS. 7a through 7g cross-sections of the relevant part of a turbocharger according to the present invention in six different alternative embodiments.

FIGS. 7a through 7 show a suspension mechanism corresponding to the present invention in six different embodiments.

In FIGS. 7a–f the same reference numbers are used as in FIG. 5, except that they are now preceded with the number 1. The nozzle ring 138 carries, close to its outer rim and in circular arrangement distributed about its circumference, a number of rollers 149, at least however three of these. The rollers 149 exhibit respectively one groove 159, in which the inner circumference of the actuating ring 148 engages and is thereby guided.

As shown in FIG. 7a, each roller 149 includes an axial extension 149' which is formed unitarily with the roller 149. This extension 149' is rotatably introduced in a bore in the nozzle ring 138 and is thereby guided. The free end of this extension can be conical or rounded.

The two disadvantages of EP-0226444 are therewith overcome. On the one hand the assembly of the turbocharger is substantially simplified, since no pins independent of the rollers exist and since the axial extensions of the rollers need to be introduced respectively in only one bore, namely in the nozzle ring, without the necessity of having other ends having to be introduced into some other, more or less axially oriented bore in the housing, and on the other hand, since the rollers are not in a non-defined manner disoriented by the different thermal expansion of the housing and the nozzle ring, which in the state of the art disturbs the axial orientation of the pins and rollers, since the pins engage in only one bore, the geometry of the actuating ring, the nozzle ring and the guide rollers remains established independent of the temperature oscillations.

Figure 7B:
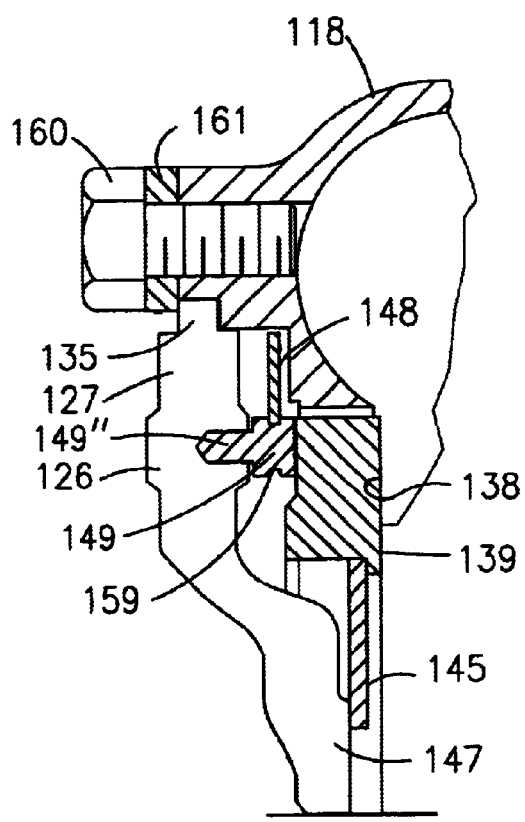

In FIG. 7b the rollers have a design similar to those of FIG. 7a, however in place of the axial extension 149' on the nozzle ring side, the axial extension 149" is provided on the side of the housing, and it is introduced in an appropriate bore in the housing 126.

In this manner the same advantage achieved as with the type of invention according to FIG. 7a with respect to simplification of the assembly since the rollers as well as the actuating ring and the nozzle ring 138 can be assembled together with the housing part 126, before the housing part 126 is assembled to the turbine housing 118. Here also it is avoided, to have to insert free ends of pins in more or less aligned bores in the other component.

The described effect of the temperature oscillations is likewise unimpaired since there is no longer any necessity to maintain alignment of orientation of boreholes in two different thermally cycling parts.

Figure 7C:
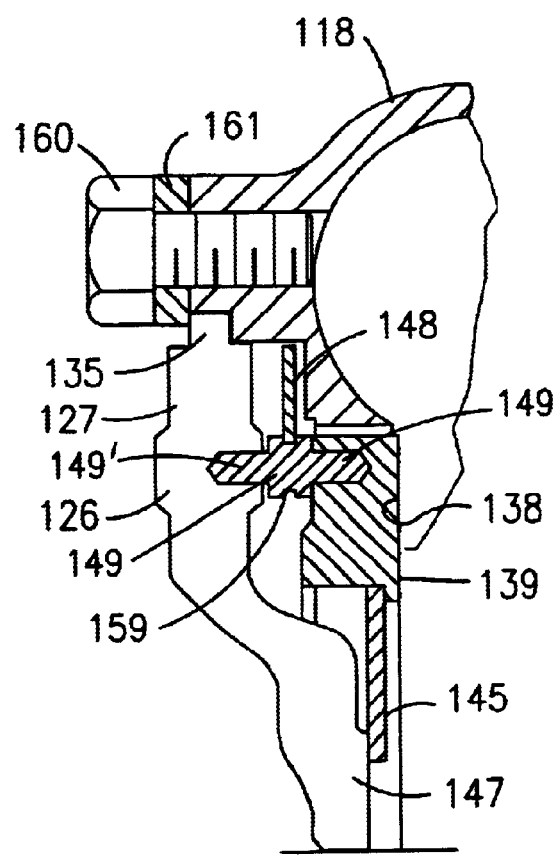

FIG. 7c shows rollers 149 with two axial extensions 149' and 149", which engage in opposing bores both in the nozzle ring 138 as well as in the housing part 126. These rollers permit a simplified assembly since they are manufactured in one piece and not, as in the prior art, comprised of two separate independent parts.

Figure 7D:
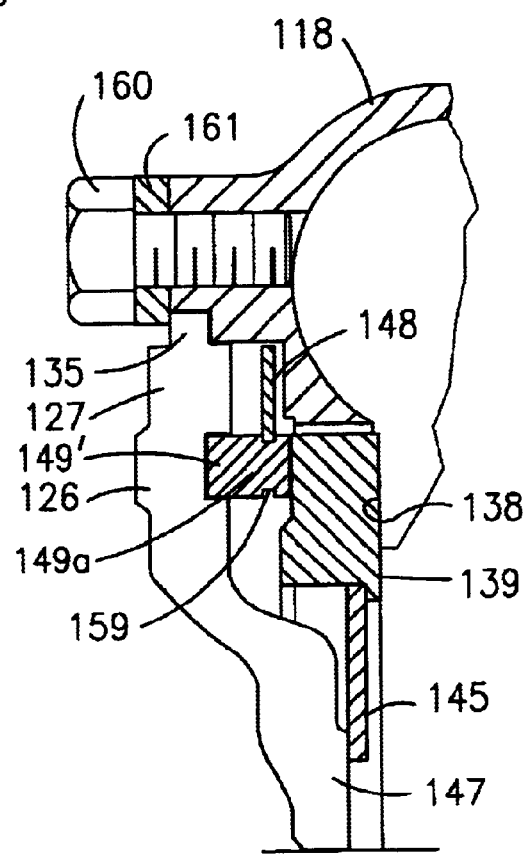
Figure 7E:
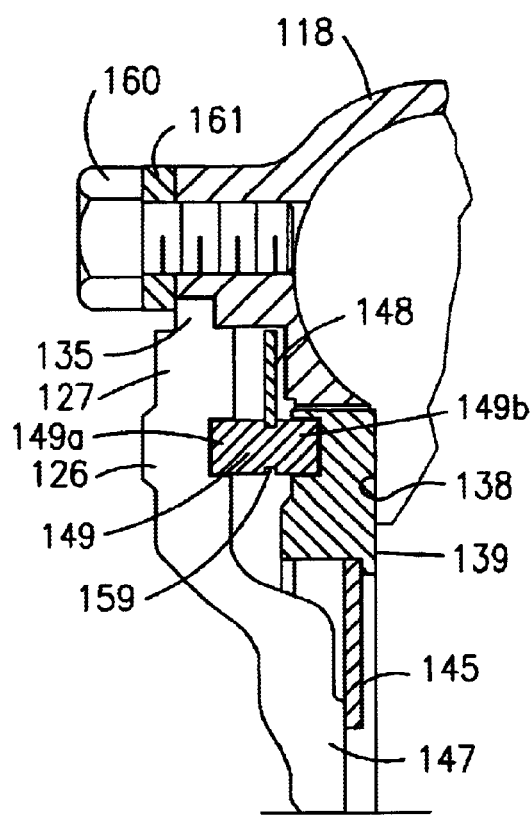
Figure 7F:
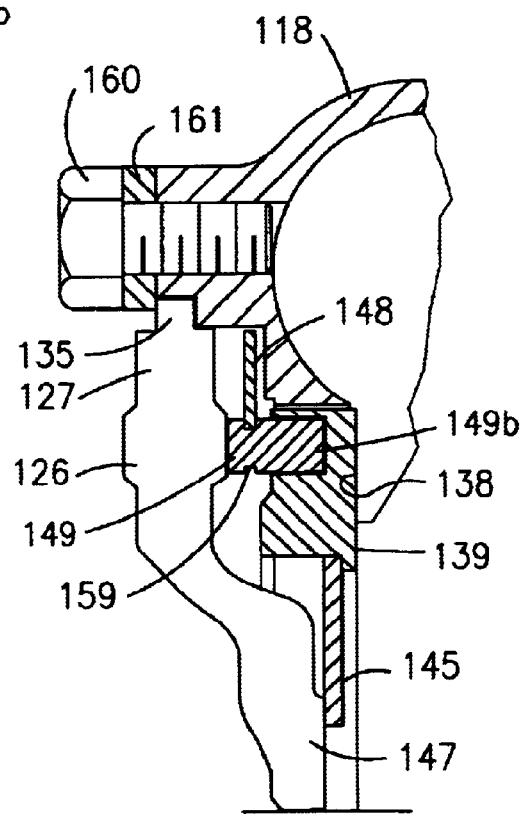
Figure 7G:
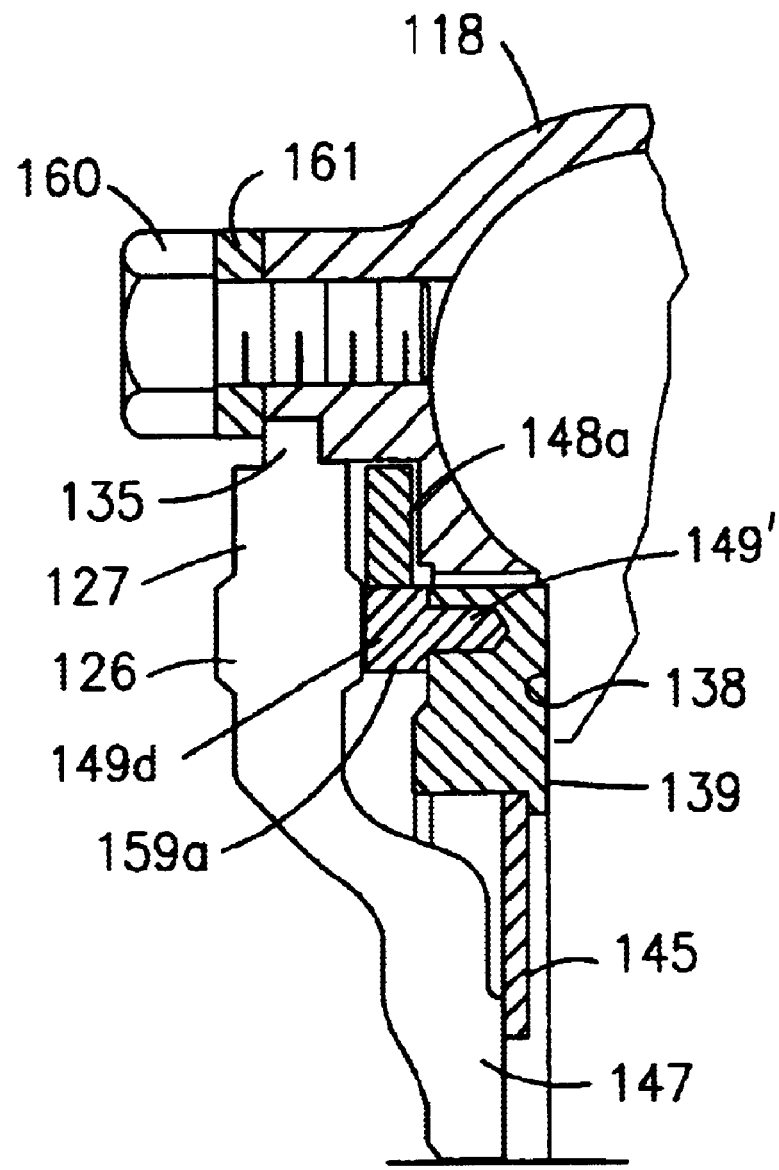

FIGS. 7d, 7e and 7f show rollers, in which the axial extensions 149a and 149b are not, as in FIGS. 7a–c of smaller diameter than the actual rollers 149, but rather exhibit the same diameter as these.

In the rollers of FIGS. 7*d*–*f* one could practically refer to the entirety of the rollers and axial extensions as "rollers", wherein the axial extensions of the rollers exhibit an axial length, which enables them to engage directly in bores in either in the housing part 126, as the extensions 149*a* in FIG. 7*d*, or in bores in the nozzle ring 138, as the extensions 149*b* in FIG. 7*f*, or in both as in FIG. 7*e*.

Numerous modifications of the described embodiments of the invention would occur to the person of ordinary skill. The present description should thus be considered as exemplary and in no way should be considered to limit the scope of protection of the present invention. This scope of protection should be determined only by the definition of the invention in the following claims, together with their equivalents.

Thus, for example, the housing part in which the bores 55*a* are incorporated in the second embodiment of the invention, could be a part independent of the turbine housing and thus a construction component to be mounted to the turbine housing, or could together with the turbine housing form a unitary part.

What is claimed is:

1. A turbocharger in which gas is directed through a first annular passage (30) to the turbine, including a housing (18, 24, 26, 126), a ring of guide blades (34) in the first annular passage (30), which are mounted pivotably on a nozzle ring (138) defining one boundary of the first annular passage, and an annular actuating ring (48, 148) coupled to pivot the blades by movement of the actuating ring in relation to the nozzle ring, and a suspension mechanism (55) for the actuating ring (48, 148) which brings about a coaxial location of the nozzle ring and the actuating ring relative to each other and about the turbine shaft, wherein rollers (49, 149) are provided about one of the inner and outer circumference of the actuating ring, which rollers are provided in a second annular passage (70, 170) formed between a housing part (126) and the nozzle ring (38, 138), wherein each of the rollers (149) includes at least on axial extension, which is rotatably seated in a bore in one of the nozzle ring (38, 138), the housing part (126), and both.

2. A turbocharger according to claim 1, wherein the axial extensions (149') of the rollers (149) are seated in bores in the housing part (126).

3. A turbocharger according to claim 1, wherein the axial extensions (149") of the rollers (149) are seated in bores in nozzle ring (38).

4. A turbocharger according to claim 1, wherein the axial extensions (149', 149") are seated in bores in the housing part (126) as well as in bores in the nozzle ring (38).

5. A turbocharger according to claim 1, wherein the axial extensions (149', 149") are tapered or rounded at their free ends in order to facilitate insertion into the bores.

6. A turbocharger according to claim 1, wherein the axial extensions (149") exhibit smaller diameter than the rollers (149).

7. A turbocharger according to claim 1, wherein the axial extensions (149*a*, 149*b*) exhibit the same diameter as the rollers (149).

8. A turbocharger according to claim 1, wherein the rollers (49, 149, 149', 149", 149*c*) include grooves (59, 159) adapted for guiding the internal circumference of the actuating ring (48, 148).

9. A turbocharger according to claim 1, wherein the rollers (149*d*) exhibit a smooth cylindrical surface (159*a*) free of grooves, and that the thickness of the actuating ring (148*a*) is only slightly less than the breadth of the second annular passage.

* * * * *